(12) United States Patent
Moore

(10) Patent No.: US 7,489,847 B1
(45) Date of Patent: Feb. 10, 2009

(54) OPTICAL FIBER WITH TUNABLE BIREFRINGENCE USING PRESSURIZED LIQUID CAPILLARIES

(75) Inventor: Gerald T. Moore, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 11/782,035

(22) Filed: Jul. 24, 2007

(51) Int. Cl.
*G02B 6/02* (2006.01)
(52) U.S. Cl. .................. 385/123; 385/124; 385/125; 385/126; 385/127; 65/385; 65/393; 65/398
(58) Field of Classification Search ......... 385/123–127; 65/385, 393, 398
See application file for complete search history.

(56) References Cited

U.S. PATENT DOCUMENTS 7,062,140 B2   6/2006  Bjarklev 7,116,887 B2 * 10/2006 Farroni et al. ............... 385/142

FOREIGN PATENT DOCUMENTS

EP    0630864 A2 * 12/1994

OTHER PUBLICATIONS

K. Nielsen, D. Noordegraaf, T. Sørensen, A. Bjarklev, and T. P. Hansen, "Selective filling of photonic crystal fibres," J. Opt. A: Pure Appl. Opt. 7, L13-L20 (2005).

* cited by examiner

*Primary Examiner*—Jennifer Doan
(74) *Attorney, Agent, or Firm*—Kenneth E. Callahan

(57) ABSTRACT

A single-mode optical fiber segment incorporating liquid-filled holes parallel to the core that are sealed at each end. Heating the liquid produces stress in the fiber and thereby increases the birefringence level. Alternatively the holes may be filled and sealed at a temperature lower than the temperature at which the fiber will be operated, the temperature difference determining the stress level for given hole characteristics.

5 Claims, 1 Drawing Sheet

Cross-section of fiber with Liquid-filled stress elements

Cross-section of fiber with both liquid-filled stress elements and solid stress rods

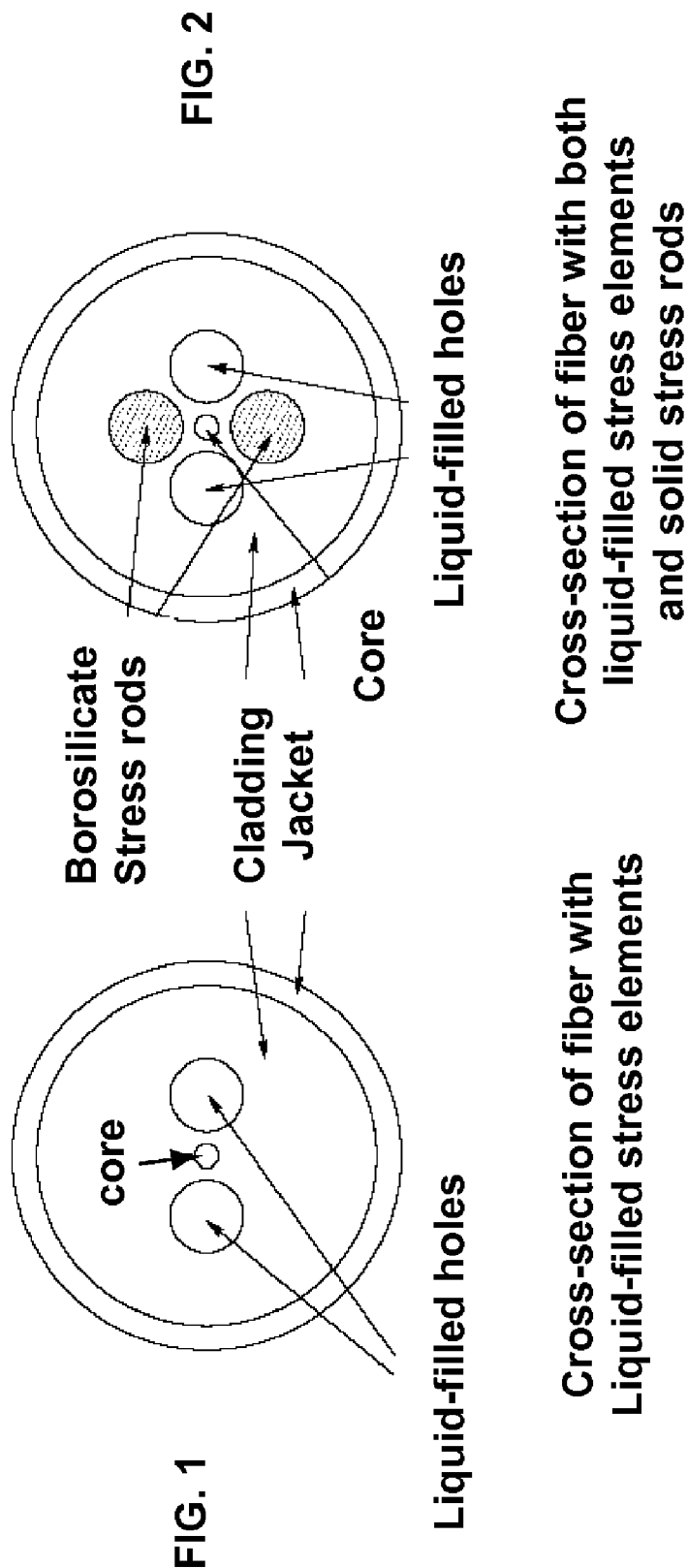

OPTICAL FIBER WITH TUNABLE BIREFRINGENCE USING PRESSURIZED LIQUID CAPILLARIES

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The present invention relates generally to birefringence in single-mode optical fibers, and in particular, to tuning the level of birefringence in such a fiber for use in, for example, an in-fiber optical isolator.

An in-fiber optical isolator suitable for high power operation is the subject of a co-pending invention (Ser. No. 11/626,095 filed Mar. 8, 2007) and is hereby incorporated by reference. In this isolator, Faraday rotation occurs in a birefringent fused-silica single-mode optical fiber whose polarization beat length has been matched to the period of an array of permanent magnets arranged in a repelling configuration. This Faraday rotation method is called magnetic quasi-phase matching. The beat length is the ratio of the wavelength of light propagating in the core of the fiber to the fiber birefringence. A well-known technique for producing birefringence in the core of an optical fiber is to insert two borosilicate rods into holes drilled into the preform on either side of the core. During the drawing and cooling of the fiber the larger thermal expansion coefficient of the borosilicate results in stress on the core, and this produces birefringence. This type of birefringent fiber in which two circular stress rods are placed on opposite sides of the core is called "panda fiber." The magnitude of the birefringence produced by this technique, however, cannot be predicted with sufficient accuracy for purposes of the magnetic quasi-phase matching technique. Furthermore, if it is desired to change the operating wavelength, but keep the beat length matched to a fixed magnet array, it is necessary to change the birefringence. Although it is possible to reduce the birefringence by heating a fiber containing stress rods, it is not convenient to do so when the fiber is confined in the gap of a magnet array. Moreover, excessive heating within the magnetic array can cause demagnetization of the array.

It would be desirable to be able to vary the stress in a portion of an optical fiber segment and thereby to vary the birefringence in the entire length of the segment. This would facilitate, for example, matching the beat length to the period of a fixed magnet array to produce Faraday rotation in a high-power optical isolator.

SUMMARY OF THE INVENTION

The present invention involves a birefringent single-mode optical fiber in which the magnitude of the birefringence of a fiber segment can be tuned by changing the stress level of the segment. A fiber may be manufactured with two cylindrical capillaries (holes) adjacent and parallel to the core. Alternatively the fiber may also be manufactured with two borosilicate stress rods adjacent to the core in the plane orthogonal to the holes. Segments of the fiber are cut, and the holes therein are filled with a liquid such as ethanol. The liquid is sealed into the fiber. As the pressure of the liquid within the cylindrical capillaries is raised by increasing the temperature of the liquid the stress on the core is increased, thereby increasing the birefringence. Alternatively, fiber segments filled at lower temperatures will exhibit greater birefringence when used at a given elevated temperature. Borosilicate stress rods, if present, also contribute to the birefringence, though this contribution is the same for all segments of the fiber. By appropriate choice of the filling temperature or by heating part of the fiber segment, the polarization beat length at a desired optical wavelength can be tuned, for example, to match the period of an array of permanent magnets used in a high-power in-fiber isolator. Varying the pressure of the liquid at one point on the fiber segment, such as that portion of the fiber segment outside of the array of permanent magnets, varies the pressure throughout the entire segment and hence varies the birefringence of the entire segment including that part of the fiber segment within the magnet array.

BRIEF DESCRIPTION OF THE DRAWINGS

FIG. 1 shows a cross-section of fiber with two liquid filled stress elements.

FIG. 2 is a cross-section of fiber with both liquid filled stress elements and solid borosilicate stress rods.

DESCRIPTION OF THE PREFERRED EMBODIMENT

There has been much interest lately in optical fibers with cylindrical holes running the length of the fiber. These holes have been used to guide light in the fiber. These fibers are called photonic crystal fibers (PCF's). Such fibers have included PCF's with hollow cores. Optical guiding in such cores is possible because of the presence of an array of other (usually smaller) holes which surround the core. It is possible to fill the core of a hollow-core PCF with gas or liquid. For example, stimulated Raman scattering in a gas can be produced at low optical power because of the long interaction length possible in a gas-filled PCF. The process for filling a PCF with liquid has been studied [K. Nielsen, D. Noordegraaf, T. Sørensen, A. Bjarklev, and T. P. Hansen, "Selective filling of photonic crystal fibres," J. Opt. A: Pure Appl. Opt. 7, L13-L20 (2005)] and is discussed in U.S. Pat. No. 7,062,140.

The present invention is concerned with tuning the birefringence in a fused-silica single mode optical fiber (as opposed to a photonic crystal fiber) with possible use in a high-power in-fiber optical isolator. In this isolator, Faraday rotation occurs in a birefringent fiber whose polarization beat length is matched to the period of a fixed array of permanent magnets arranged in a repelling configuration. This Faraday rotation method is called magnetic quasi-phase matching. The beat length is the ratio of the wavelength of light propagating in the core of the fiber to the fiber birefringence. The birefringence of the fiber can be varied by varying the stress within the fiber. A panda fiber consisting of two circular stress rods placed on opposite sides of the core is one type of birefringent fiber. It is manufactured to produce a specified fixed level of birefringence. The magnitude of the birefringence, however, cannot be predicted with sufficient accuracy to match the beat length at a specified wavelength propagating in the core to the period of the fixed magnet array of the optical isolator. The birefringent fiber segment in an optical isolator is partly within the magnet array and partly without. One embodiment of the present invention enables the fine tuning of the birefringence of a modified panda fiber by varying the stress throughout the fiber segment by affecting only that portion of the fiber segment which is outside the magnet array. For a fixed magnet array, the optical isolator can be operated at different wavelengths because the correct level of birefringence can be readily adjusted by varying the stress in the fiber.

A panda fiber produces birefringence in its core by inserting borosilicate rods into holes drilled into the preform on either side of the core. During the drawing and cooling of the fiber the larger thermal expansion coefficient of the borosilicate results in stress on the core, and this produces birefringence. One embodiment of the present invention can be manufactured by modifying the panda fiber process. For example, two additional holes may be drilled in the preform on either side of the core orthogonal to the borosilicate rod holes. These holes are left empty, rather than having stress rods inserted into them. After the fiber is drawn, a selected length (on the order of 2 to 3 m) may be cut for use as a Faraday rotator. The holes in this length of fiber may then be filled with a liquid having a large thermal expansion coefficient such as ethanol. The ends of the liquid-filled holes are then sealed. For example, the ends of the liquid-filled holes may be loaded with UV-curing epoxy which, when hardened, seals in the liquid. Since epoxy close to the fiber ends can be damaged or burned when the fiber is fusion spliced to other fiber, the seals should be made long enough that they continue to function after heating the fiber ends. The dimension, number, and location of the holes and stress rods may vary. Appropriate values can be calculated numerically by stress analysis.

For use in the optical isolator, about 1 meter of the fiber is inserted into the magnet array. If much of the remaining fiber is enclosed in a heater, heating the fiber causes the expanding liquid to produce stress within the fiber core, increasing birefringence. This birefringence is produced even in the unheated segment of fiber within the magnet array since the pressure on the liquid is exerted at a constant value throughout the fiber.

Since the birefringence produced by borosilicate stress rods is a decreasing function of temperature, while the birefringence produced by an expanding liquid is an increasing function of temperature, a fiber with both types of stress elements can be designed to have a beat length which remains matched to the period of a magnet array over a greater temperature range. FIG. 2 shows the cross-section of a fiber with two liquid-filled holes positioned orthogonally to the two borosilicate stress rods. The positive temperature derivative of birefringence produced by the liquid-filled holes can be compensated by the negative temperature derivative of birefringence produced by the borosilicate stress rods. The core has an index of refraction of $n_1$. The cladding surrounding the core and the holes has an index of $n_2$. In this type of fiber, unlike a photonic crystal fiber, the core index is greater than the cladding index ($n_1 > n_2$) so that the light propagating in the core does not leak into the two liquid-filled stress elements. In a PCF, the material of the core may have the same or even lower index as the inner cladding, but the pattern of air holes surrounding the core is designed to confine the fundamental mode overlapping the said pattern of air holes and couple away the undesired higher-order modes from the core. In U.S. Pat. No. 7,062,140, the birefringence mentioned [177] is due to light propagating partly within the off-center liquid-filled portions of the photonic crystal fiber (PCF). The pressures P1 and P2 [FIG. 11] are merely used for controlling the filling of the PCF with liquid. In the non-PCF of the present invention the light is essentially confined to the core because $n_1 > n_2$ and varying the pressure in the liquids is used to vary the stress in the fiber.

An alternative embodiment shown in cross-section in FIG. 1 uses two liquid-filled holes lying in a plane of the core. Pressure in the liquid exerts stress on the core, causing birefringence. When the liquid in the fiber holes is sealed at both ends, the pressure and hence the birefringence, can be increased throughout the fiber segment by heating a portion of the fiber.

Alternatively, greater birefringence at the temperature where the fiber is to be operated can be obtained if the fiber holes are initially loaded with liquid at a lower temperature. When the loading temperature is used to tune the birefringence, there is no need to heat the fiber when it is in use as a Faraday rotator. Fiber segments with different amounts of birefringence, and thus phase matched to a given magnet array at different wavelengths, can be prepared at different loading temperatures. A typical 100-meter length of manufactured fiber could be cut into many segments, which can be loaded at various temperatures so as to be tuned for operation at various wavelengths. This is much less expensive than manufacturing different fibers or different magnet arrays for each wavelength of interest. This process would work for panda fiber modified with liquid-filled holes or fiber with only liquid-filled holes.

The invention provides a method for tuning the birefringence of a segment of optical fiber. This facilitates, for example, matching the polarization beat length at a desired wavelength to the period of an array of magnets in order to obtain Faraday rotation in an in-fiber optical isolator. The birefringence can be varied in a fiber by varying the pressure in liquid-filled holes using heat or by loading the holes at a temperature lower than the temperature at which it will be operated. The fiber may contain either liquid-filled holes alone or a combination of liquid-filled holes and borosilicate stress rods. The dimensions and locations of the holes and stress rods may vary. Appropriate values can be calculated numerically by stress analysis. Alternative liquids to ethanol could be used. Multi-mode fiber may be used, provided that light propagates only in the fundamental mode.

The invention claimed is:

1. An optical fiber segment in which the birefringence may be varied by varying the stress within the fiber, the fiber comprised of:
   a. a single-mode optical fiber segment having a core with index of refraction of $n_1$ surrounded by a cladding layer of index of refraction $n_2$ where $n_1$ is greater than $n_2$;
   b. a plurality of holes paralleling said core within said cladding layer and having first and second ends;
   c. a liquid having a high thermal expansion coefficient to fill said holes;
   d. means to seal the ends of said holes; and
   e. means for heating at least a portion of said fiber segment, whereby thermal expansion of said liquid produces stress within said fiber segment increasing the level of birefringence.

2. The optical fiber segment of claim 1, wherein two borosilicate rods are incorporated parallel to and on either side of said core and lying in a plane passing through said core.

3. A method of making an optical fiber segment with a specific birefringence, the fiber segment having a core with index of refraction of $n_1$ surrounded by a cladding layer of index of refraction $n_2$ where $n_1$ is greater than $n_2$, the method comprised of:
   a. manufacturing an optical fiber with two holes parallel to and at opposite sides of said core and lying in a plane passing through said core;
   b. filling said holes with a liquid having a high thermal expansion coefficient at a temperature lower than a temperature that said fiber will be used; and
   c. sealing the ends of said holes while at said lower temperature.

4. The manufacturing method of claim 3, wherein the manufacturing step a) further incorporates two borosilicate rods parallel to and at opposite sides of said core and lying in a plane orthogonal to the plane in which said holes lie.

5. A method of producing a thermally variable birefringent fiber segment by modifying a panda fiber, said panda fiber being a single-mode optical fiber segment having a core with index of refraction of n1 surrounded by a cladding layer of index of refraction n2 where n1 is greater than n2 and having two borosilicate rods inserted into holes drilled into a fiber preform on either side of said core, the method comprised of:
   a. drilling two additional holes in said fiber preform paralleling said core within said cladding layer and located orthogonal to said borosilicate rod holes, each hole having a first and a second end;
   b. drawing fiber from said preform, the resulting said fiber having a core centered in a cladding, two borosilicate rods in said cladding on either side of said core, and two empty holes in said cladding on either side of said core in the orthogonal plane,
   c. filling said holes with a high thermal expansion liquid at a temperature below the temperature of use;
   d. sealing the ends of said holes; and
   e. heating at least a portion of said fiber segment to the temperature of use, whereby thermal expansion of said liquid increases stress within said fiber segment varying the level of birefringence within said core.

\* \* \* \* \*